US006283326B1

(12) United States Patent
Lindsey

(10) Patent No.: US 6,283,326 B1
(45) Date of Patent: Sep. 4, 2001

(54) ANTI-THEFT NEWSPAPER MACHINE

(76) Inventor: Danny E. Lindsey, 1620 W. First St. #83, Winston-Salem, NC (US) 27104

( * ) Notice: Subject to any disclaimer, the term of this patent is extended or adjusted under 35 U.S.C. 154(b) by 0 days.

(21) Appl. No.: 09/113,776

(22) Filed: Jul. 10, 1998

(51) Int. Cl.[7] .................... B65G 59/00
(52) U.S. Cl. .................... 221/279; 221/280
(58) Field of Search .................... 221/279, 280, 221/155, 2, 281, 282, 154, 160, 98

(56) References Cited

U.S. PATENT DOCUMENTS 3,708,087 * 1/1973 Schonthal .................... 221/110
4,428,503 * 1/1984 Martin .................... 221/232
4,919,250 * 4/1990 Olson et al. .................... 194/248
5,000,346 * 3/1991 Moore et al. .................... 221/215
5,205,437 * 4/1993 Elder et al. .................... 221/103
5,305,913 * 4/1994 Shade .................... 221/226
5,363,987 * 11/1994 Crawford et al. .................... 221/195
5,709,315 * 1/1998 Kahler et al. .................... 221/155
5,791,511 * 8/1998 Lowing .................... 221/6
5,813,568 * 9/1998 Lowing .................... 221/6
5,921,436 * 7/1999 Lowing .................... 221/279

* cited by examiner

*Primary Examiner*—Christopher P. Ellis
*Assistant Examiner*—Rashmi Sharma

(57) ABSTRACT

A newspaper dispenser is provided including a housing having an opening formed thereon. Also included is a support plate slidably mounted within the housing with a plurality of newspapers stacked thereon. A money acceptor is provided for raising the support plate an incremental amount when a predetermined amount of money is accepted. As such, only one newspaper is capable of being removed via the opening at a time.

9 Claims, 2 Drawing Sheets

ANTI-THEFT NEWSPAPER MACHINE

BACKGROUND OF THE INVENTION

1. Field of the Invention

The present invention relates to newspaper vending machines and more particularly pertains to a new anti-theft newspaper machine for preventing the theft of newspapers from a newspaper vending machine.

2. Description of the Prior Art

The use of newspaper vending machines is known in the prior art. More specifically, newspaper vending machines heretofore devised and utilized are known to consist basically of familiar, expected and obvious structural configurations, notwithstanding the myriad of designs encompassed by the crowded prior art which have been developed for the fulfillment of countless objectives and requirements.

Known prior art newspaper vending machines include U.S. Pat. No. 5,301,831; U.S. Pat. No. 5,209,336; U.S. Pat. No. Des. 334,030; U.S. Pat. No. 5,105,437; U.S. Pat. No. 5,178,299; and U.S. Pat. No. Des. 319,077.

In these respects, the anti-theft newspaper machine according to the present invention substantially departs from the conventional concepts and designs of the prior art, and in so doing provides an apparatus primarily developed for the purpose of preventing the theft of newspapers from a newspaper vending machine.

SUMMARY OF THE INVENTION

In view of the foregoing disadvantages inherent in the known types of newspaper vending machines now, present in the prior art, the present invention provides a new anti-theft newspaper machine construction wherein the same can be utilized for preventing the theft of newspapers from a newspaper vending machine.

The general purpose of the present invention, which will be described subsequently in greater detail, is to provide a new anti-theft newspaper machine apparatus and method which has many of the advantages of the newspaper vending machines mentioned heretofore and many novel features that result in a new anti-theft newspaper machine which is not anticipated, rendered obvious, suggested, or even implied by any of the prior art newspaper vending machines, either alone or in any combination thereof.

To attain this, the present invention generally comprises a housing with a rectangular configuration. As shown in the Figures, the housing includes a bottom face, a top face, a front face, a rear face and a pair of side faces formed therebetween for defining an interior space. As shown in FIGS. 1 & 2, the front face has a lower extent with a square cut out formed therein. A transparent large door is hingably coupled along a lower edge thereof over the square cut out. Mounted on an upper edge of the large door is a key-actuated lock mechanism for allowing the opening of the large door only upon the insertion of a key within the lock mechanism. In the preferred embodiment, the front fac( further includes an upper extent with a size less than 1/10 that of the lower extent. The upper extent of the front face has a rectangular cut out formed therein. Hingably coupled along a lower edge of the rectangular cut out is a small door that has a handle for allowing the small door to be opened freely. Next provided is a belt assembly including two pairs of vertically aligned pulleys rotatably mounted on each of the side faces of the housing. Each pair of the pulleys is situated within the interior space and is situated adjacent one of the front and rear faces thereof. As shown in FIG. 5, each pair of pulleys extends along an entire height of the housing. Four belts are each mounted on an associated pair of the pulleys. A support plate is included having four corners each fixedly mounted to one of the belts. By this structure, the support plate moves vertically upon the rotation of at least one of the pulleys. In use, the support plate has a stack of newspapers stacked thereon. As best shown in FIGS. 4–7, a gear assembly includes a casing mounted on one of the side faces of the housing. The casing resides within the interior space of the housing and adjacent to the bottom face thereof. A ratchet gear of a first diameter is operatively coupled to an axle coupling a pair of the pulleys. The ratchet gear is thus adapted for effecting the rotation of the axle and associated pulleys upon the rotation of the ratchet gear in a first direction. In contrast, the ratchet gear itself rotates independently of the axle upon the rotation thereof in a second direction. Associated therewith is a second gear having a diameter greater than the first diameter. In operation, the second gear is in constant engagement with the first gear. A leaf spring is situated about an axle associated with the second gear within the casing. The leaf spring functions for urging the second gear in a neutral orientation. The gear assembly further includes a lever having a bottom end coupled to the axle associated with the second gear. The lever extends upwardly from the axle to which is coupled and resides exterior of one of the side faces of the housing. In use, the lever allows a user to selectively bias the second gear in the first direction when pulled. This action raises the support plate an incremental amount for reasons that will soon become apparent. Mounted on the front face of the housing is a coin acceptor. The coin acceptor includes a money slot for accepting coins. A detecting mechanism serves for detecting the insertion of a predetermined amount of coins within the money slot. An actuator pin is slidably mounted on the detecting mechanism, as shown in FIG. 4. In operation, the actuator pin has a normal unbiased orientation in engagement with the second gear for precluding the rotation thereof. The actuator pin further has a biased orientation out of engagement with the second gear. In such orientation, the actuator pin serves for allowing the rotation of the second gear. Upon the detection of the acceptance of the predetermined amount of coins by the detecting mechanism, the detecting mechanism transfers the actuator pin to the biased orientation. This raises one of a plurality of newspapers such that only one newspaper is capable of being removed via the small door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new anti-theft newspaper machine apparatus and method which has many of the advantages of the newspaper vending machines mentioned heretofore and many novel features that result in a new anti-theft newspaper machine which is not anticipated, rendered obvious, suggested, or even implied by any of the prior art newspaper vending machines, either alone or in any combination thereof.

It is another object of the present invention to provide a new anti-theft newspaper machine which may be easily and efficiently in manufactured and marketed.

It is a further object of the present invention to provide a new anti-theft newspaper machine which is of a durable and reliable construction.

An even further object of the present invention is to provide a new anti-theft newspaper machine which is susceptible of a low cost of manufacture with regard to both materials and labor, and which accordingly is then susceptible of low prices of sale to the consuming public, thereby making such anti-theft newspaper machine economically available to the buying public.

Still yet another object of the present invention is to provide a new anti-theft newspaper machine which provides in the apparatuses and methods of the prior art some of the advantages thereof, while simultaneously overcoming some of the disadvantages normally associated therewith.

Still another object of the present invention is to provide a new anti-theft newspaper machine for preventing the theft of newspapers from a newspaper vending machine.

Even still another object of the present invention is to provide a new anti-theft newspaper machine that includes a housing having an opening formed thereon. Also included is a support plate slidably mounted within the housing with a plurality of newspapers stacked thereon. A money acceptor is provided for raising the support plate an incremental amount when a predetermined amount of money is accepted. As such, only one newspaper is capable of being removed via the opening at a time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
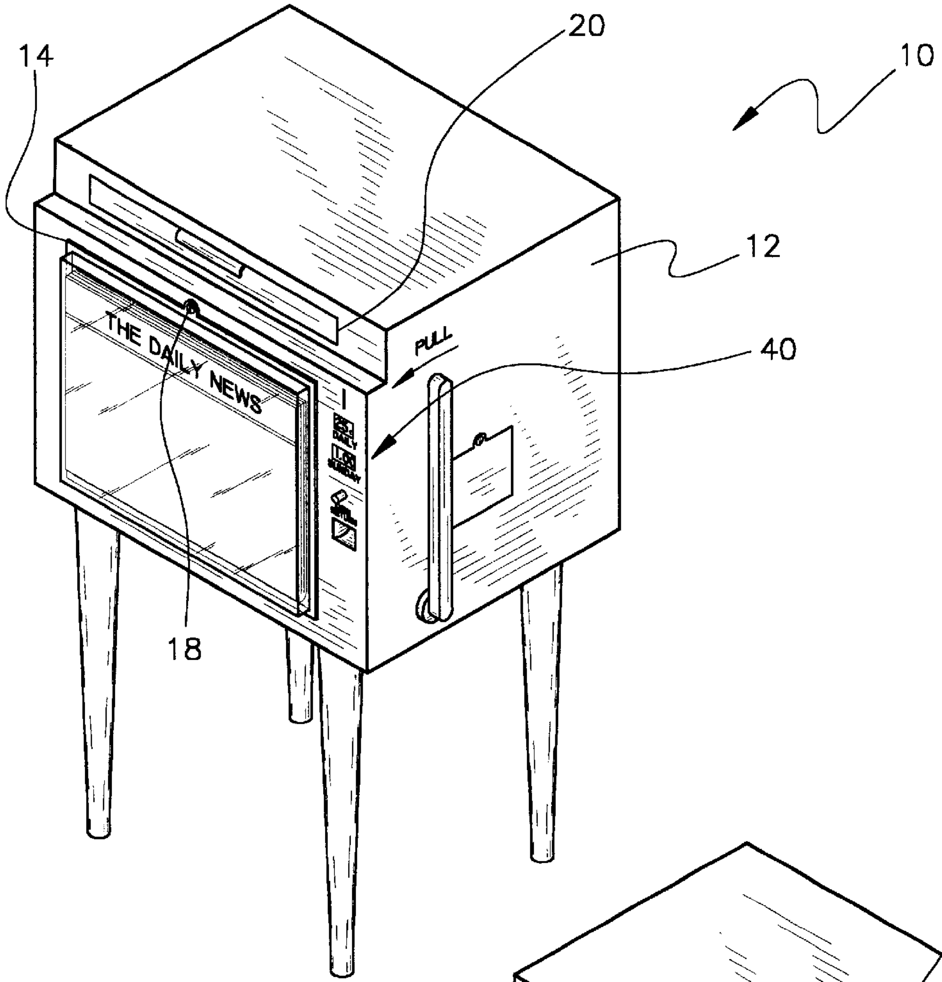
FIG. 1 is a perspective view of a new anti-theft newspaper machine according to the present invention.
Figure 2:
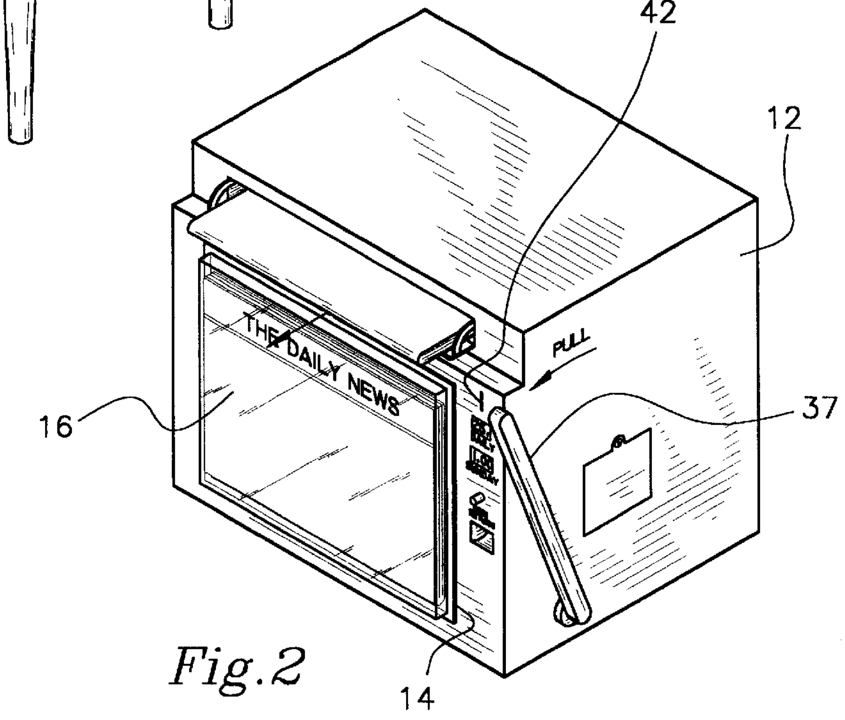
FIG. 2 is a perspective view of the present invention with the actuator lever biased.
Figure 3:
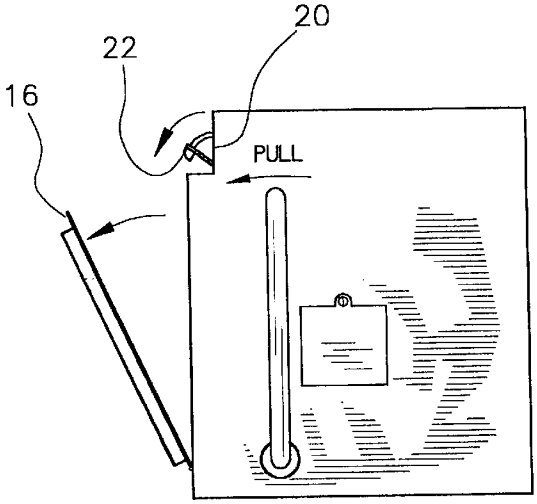
FIG. 3 is a side view of the present invention.
Figure 4:
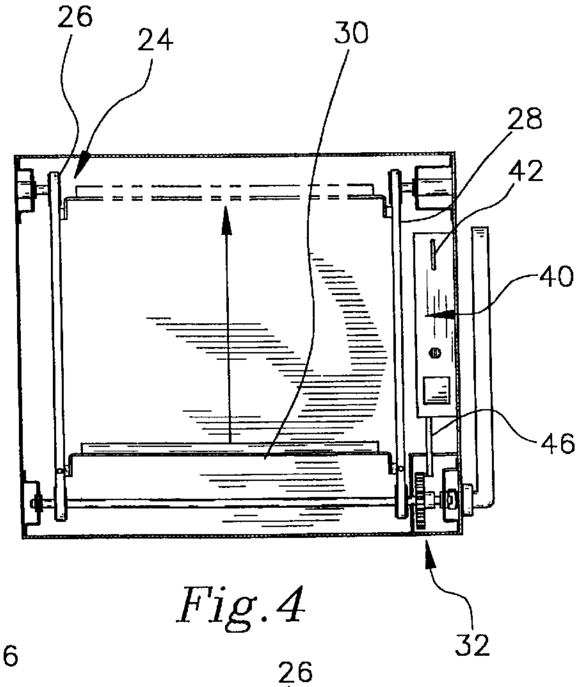
FIG. 4 is a front cross-sectional view of the present invention.

With reference now to the drawings, and in particular to FIGS. 1 through 7 thereof, a new anti-theft newspaper machine embodying the principles and concepts of the present invention and generally designated by the reference numeral 10 will be described.

The present invention, designated as numeral 10, includes a housing 12 with a rectangular configuration. As shown in the Figures, the housing includes a bottom face, a top face, a front face, a rear face and a pair of side faces formed therebetween for defining an interior space. With specific reference to FIGS. 1 & 2, it is shown that the front face has a lower extent with a square cut out 14 formed therein. A transparent large door 16 is hingably coupled along a lower edge thereof over the square cut out. A newspaper is adapted to be situated within the transparent door. Mounted on an upper edge of the large door is a key-actuated lock mechanism 18 for allowing the opening of the large door only upon the insertion of a key within the lock mechanism.

In the preferred embodiment, the front face further includes an upper extent with a size less than 1/10 that of the lower extent. Further, the upper extent of the front face resides in a plane recessed and offset with respect to the lower extent. The upper extent of the front face has a rectangular cut out 20 formed therein. Hingably coupled along a lower edge of the rectangular cut out is a small door 22 that has a handle for allowing the small door to be opened freely.

Figure 5:
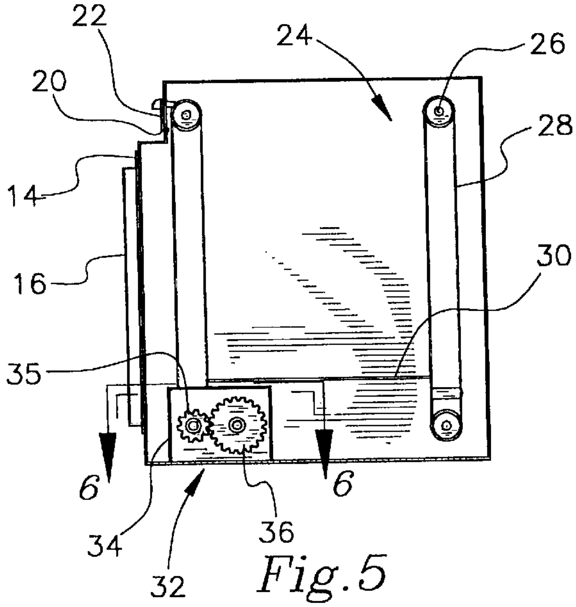
FIG. 5 is a side cross-sectional view of the present invention.
Figure 6:
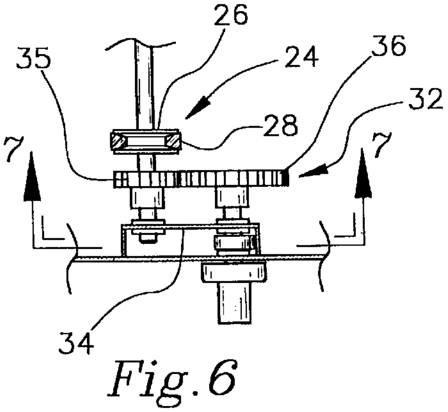
FIG. 6 is a top cross-sectional view of the car assembly of the present invention taken along line 6—6 shown in FIG. 5.
Figure 7:
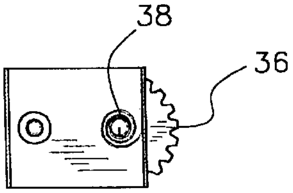
FIG. 7 is a side view of the leaf spring and other related components of the gear assembly of the present invention taken along line 7—7 shown in FIG. 6.

Next provided is a belt assembly 24 including two pairs of vertically aligned pulleys 26 rotatably mounted on each of the side faces of the housing. Each pair of the pulleys is situated within the interior space and is situated either the front or rear face thereof. As shown in FIG. 5, each pair of pulleys extends along an entire height of the housing. Four belts 28 are each mounted on an associated pair of the pulleys. A support plate 30 with a size comparable with that of the bottom face of the housing is included having four corners each fixedly mounted to one of the belts. By this structure, the support plate moves vertically upon the rotation of at least one of the pulleys. In use, the support plate has a stack of newspapers positioned thereon.

As best shown in FIGS. 4–7, a gear assembly 32 includes a casing 34 mounted on one of the side faces of the housing. The casing resides within the interior space of the housing and adjacent to the bottom face thereof. A ratchet gear 35 of a first diameter is operatively coupled to an axle coupling a bottom front pair of the pulleys. It should be noted that each opposed pair of the pulleys has a common axle to which they are fixed. The ratchet gear is adapted for effecting the rotation of the axle and associated pulleys upon the rotation of the ratchet gear in a first direction. In contrast, the ratchet gear itself rotates independently of the axle upon the rotation thereof in a second direction. This may be accomplished with a spring-loaded pawl and teeth combination situated between the ratchet gear and the associated axle, as is conventional of ratchets.

Associated therewith is a second gear 36 having a diameter greater than the first diameter. In operation, the second gear is in constant engagement with outer teeth of the first gear. A leaf spring 38 is situated about an axle associated with the second gear within the casing. Further, the leaf spring has a first end connected to the axle of the second gear and a second end connected to the casing. As such, the leaf spring functions for urging the second gear in a neutral orientation. The gear assembly further includes a lever 37 having a bottom end coupled to the axle associated with the second gear. The lever extends upwardly from the axle to which it is coupled and resides exterior of one of the side faces of the housing. In use, the lever allows a user to selectively bias the second gear in the first direction when pulled. This action raises the support plate an incremental amount for reasons that will soon become apparent.

Mounted on the front face of the housing, is a coin acceptor 40. The coin acceptor includes a money slot 42 for accepting coins. A detecting mechanism serves for detecting the insertion of a predetermined amount of coins within the money slot. An actuator pin 46 is slidably mounted on the coin acceptor and connected to the detecting mechanism. In operation, the actuator pin has a normal unbiased orientation in engagement with the second gear for precluding the rotation thereof. The actuator pin further has a biased orientation out of engagement with the second gear. In such orientation, the actuator pin serves for allowing the rotation of the second gear. Upon the insertion of the predetermined amount of coins as indicated by the detecting mechanism, the actuator pin is biased just for a predetermined time period with a solenoid/timer or in the alternative, maintained biased and transferred back to the unbiased orientation as a function of the lever returning to its rest position. In yet another embodiment, a motor may be employed to operate the gear and belt assemblies. When the actuator pin is biased, the lever may be used to raise the newspapers such that only one newspaper is capable of being removed via the small door.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, arc deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to, falling within the scope of the invention.

I claim:

1. A newspaper dispenser comprising, in combination:

a housing with a rectangular configuration including a bottom face, a top face, a front face, a rear face and a pair of side faces formed therebetween for defining an interior space, the front face having a lower extent with a square cut out formed therein, a transparent large door hingably coupled along a lower edge thereof over the square cut out, and a key-actuated lock mechanism mounted on an upper edge of the large door for allowing the opening of the large door only upon the insertion of a key within the lock mechanism, the front face further including an upper extent with a size less than 1⁄10 that of the lower extent, the upper extent of the front face having a rectangular cut out formed therein with a small door hingably coupled along a lower edge thereof and having a handle for allowing the small door to be opened freely;

a belt assembly including two pairs of vertically aligned pulleys rotatably mounted on each of the side faces of the housing within the interior space thereof and situated adjacent one of the front and rear faces thereof and extending along an entire height of the housing, four belts each mounted on an associated pair of the pulleys, and a support plate having four corners each fixedly mounted to one of the belts, wherein the support plate moves vertically upon the rotation of at least one of the pulleys;

a gear assembly including a casing mounted on one of the side faces of the housing within the interior space thereof and adjacent to the bottom face of the housing, a ratchet gear of a first diameter operatively coupled to an axle coupling a pair of the pulleys, a second gear having a diameter greater than the first diameter and in engagement therewith, a leaf spring situated about an axle associated with the second gear within the casing for urging the second gear in a neutral orientation, and a lever having a bottom end coupled to the axle associated with the second gear and extending upwardly therefrom exterior of one of the side faces of the housing for allowing a user to selectively bias the second gear in the first direction when pulled, thereby raising the support plate an incremental amount; and a coin acceptor mechanism mounted on the front face of the housing and including a money slot for accepting coins, the coin acceptor mechanism detecting the insertion of a predetermined amount of coins within the money slot, and an actuator pin slidably mounted to the coin acceptor with a normal unbiased orientation having the actuator pin in engagement with the second gear for precluding the rotation of the second gear and a biased orientation having the actuator pin out of engagement with the second gear for allowing the rotation of the second gear, wherein the coin actuator mechanism transfers the actuator pin to the biased orientation upon the acceptance of the predetermined amount of coins by the coin acceptor mechanism, thereby allowing the raising of one of a plurality of newspapers such that only one newspaper is capable of being removed via the small door.

2. A newspaper dispenser comprising:

a housing having a front face and defining an interior space;

a support plate slidably mounted within the housing for supporting a plurality of newspapers in a stacked orientation thereon, wherein the front face of the housing has a first opening formed in the front face and being positioned for permitting a plurality of newspapers to be inserted through the first opening and loaded onto the support plate, a first door being pivotally mounted on the front face for selectively closing the first opening, the front face having a second opening located above the first opening adjacent a top of the front face for permitting an uppermost newspaper to be removed from the plurality of newspapers in the stacked orientation, the second opening having a thin, elongate shape for permitting a single newspaper to be removed through the second opening, a second door being pivotally mounted on the front face for selectively closing the second opening; and a money acceptor apparatus for raising the support plate an incremental amount when a predetermined amount of money is accepted such that only one newspaper is capable of being removed through the opening.

3. A newspaper dispenser as set forth in claim 2 wherein the money acceptor allows the raising of the support plate upon the actuation of a lever mounted on the housing.

4. A newspaper dispenser as set forth in claim 2 wherein the support plate is mounted on a belt assembly which is operatively coupled to a gear mechanism for controlling the same.

5. A newspaper dispenser comprising:

a housing including a bottom face, a top face, a front face, a rear face and a pair of side faces formed therebetween for defining an interior space, the front face having a first opening formed therein, a first door being pivotally mounted on the front face for selectively closing the first opening, the front face having a second opening located above the first opening, a second door being pivotally mounted on the front face for selectively closing the second opening, a handle being mounted on the second opening for allowing the second door to be actuated by the hand of a user;

a support plate in the housing for supporting a plurality of newspapers;

a belt assembly supporting the support plate in the housing and being adapted to raise the support plate;

a gear assembly for actuating the belt assembly to raise the support plate; and a coin acceptor mechanism mounted on the housing and including a money slot for accepting coins, the coin acceptor mechanism detecting the insertion of a predetermined amount of coins in the money slot.

6. The newspaper dispenser of claim 5 additionally comprising a key-actuated lock mechanism allowing the opening of the first door only upon the insertion of a key in the lock mechanism.

7. The newspaper dispenser of claim 5 wherein the belt assembly includes two pairs of vertically aligned pulleys rotatably mounted on each of the side faces of the housing in the interior space of the housing, the pairs of pulleys being situated adjacent one of the front and rear faces of the housing and extending along an entire height of the housing, four belts, each belt being mounted on an associated pair of the pulleys, the support plate having four corners, each corner of the support plate being fixedly mounted to one of the belts, wherein the support plate moves vertically upon the rotation of at least one of the pulleys.

8. The newspaper dispenser of claim 7 wherein the gear assembly includes a casing mounted on the housing in the interior space thereof, the casing being located adjacent to the bottom face of the housing, a ratchet gear operatively coupled to an axle coupling a pair of the pulleys, a second gear in engagement with the first gear, a spring situated about an axle associated with the second gear for urging the second gear in a neutral orientation, and a lever having a bottom end coupled to the axle associated with the second gear and being located exterior of the housing for allowing a user to selectively rotate the second gear in a first direction when pulled, thereby raising the support plate an incremental amount.

9. The newspaper dispenser of claim 8 wherein an actuator pin is slidably mounted to the coin acceptor, a normal unbiased orientation having the actuator pin in engagement with the second gear for precluding the rotation of the second gear and a biased orientation having the actuator pin out of engagement with the second gear for allowing the rotation of the second gear, wherein the coin actuator mechanism transfers the actuator pin to the biased orientation upon the acceptance of the predetermined amount of coins by the coin acceptor mechanism, thereby allowing the raising of one of a plurality of newspapers such that only one newspaper is capable of being removed via the second door.

* * * * *